United States Patent
Sanchez et al.

(10) Patent No.: US 9,906,148 B2
(45) Date of Patent: Feb. 27, 2018

(54) METHOD FOR CONTROLLING A FULL-BRIDGE DC-DC CONVERTER

(71) Applicant: FRONIUS INTERNATIONAL GMBH, Pettenbach (AT)

(72) Inventors: Allan Sanchez, Wels (AT); Josef Moeseneder, Bad Wimsbach (AT); Andreas Ehrengruber, Vorchdorf (AT)

(73) Assignee: FRONIUS INTERNATIONAL GmbH, Pettenbach (AT)

( * ) Notice: Subject to any disclaimer, the term of this patent is extended or adjusted under 35 U.S.C. 154(b) by 0 days.

(21) Appl. No.: 15/105,690

(22) PCT Filed: Dec. 15, 2014

(86) PCT No.: PCT/EP2014/077792
§ 371 (c)(1),
(2) Date: Jun. 17, 2016

(87) PCT Pub. No.: WO2015/091373
PCT Pub. Date: Jun. 25, 2015

(65) Prior Publication Data
US 2016/0329822 A1 Nov. 10, 2016

(30) Foreign Application Priority Data
Dec. 20, 2013 (AT) .............................. A 50845/2013

(51) Int. Cl.
*H02M 3/335* (2006.01)
*H02M 1/00* (2006.01)

(52) U.S. Cl.
CPC ... *H02M 3/33546* (2013.01); *H02M 3/33569* (2013.01); *H02M 3/33592* (2013.01);
(Continued)

(58) Field of Classification Search
None
See application file for complete search history.

(56) References Cited

U.S. PATENT DOCUMENTS

| | | |
|---|---|---|
| 5,563,775 A | 10/1996 | Kammiller |
| 6,185,111 B1 | 2/2001 | Yoshida |

(Continued)

FOREIGN PATENT DOCUMENTS

| | | |
|---|---|---|
| CN | 102291002 | 12/2011 |
| JP | 2005-110384 | 4/2005 |

(Continued)

OTHER PUBLICATIONS

J. Dudrik et al., "Novel soft switching DC/DC converter with controlled output rectifier", 15th International Power Electronics and Motion Control Conference, EPE-PEMC ECCE Europe, Novi Sad, 2012, PP.

(Continued)

*Primary Examiner* — Jeffrey Gblende
(74) *Attorney, Agent, or Firm* — Greenblum & Bernstein, P.L.C.

(57) ABSTRACT

In order to enable a switching process with a zero-voltage sequence (ZVS) in a full bridge DC/DC converter (1) with phase shift control without having to provide an additional inductor for this purpose, it is provided that a short-circuit is generated in the secondary-side output rectifier (5) in the transition phase from the active to the passive phase prior to switching to a passive phase of the full bridge (2), said short-cut increasing the primary current ($i_p$) across the primary side of the transformer (T) by means of the resulting short-circuit current ($i_k$) across the secondary side of the transformer.

7 Claims, 10 Drawing Sheets

Figure 1:
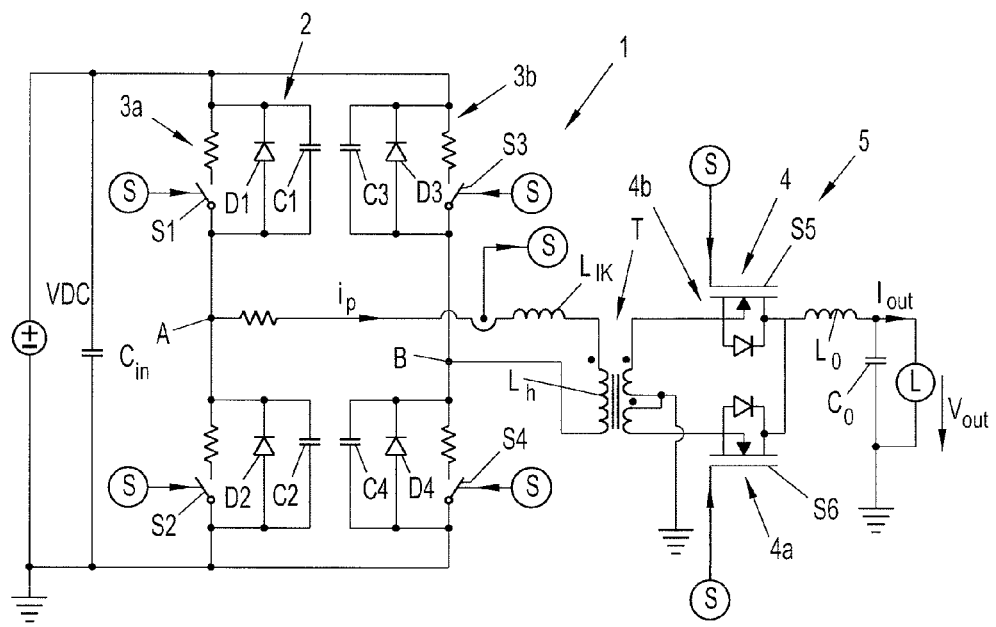

(52) U.S. Cl.
CPC .............. *H02M 2001/0058* (2013.01); *H02M 2001/0064* (2013.01); *Y02B 70/1475* (2013.01); *Y02B 70/1491* (2013.01)

(56) References Cited

U.S. PATENT DOCUMENTS

| | | | |
|---|---|---|---|
| 2004/0136209 A1* | 7/2004 | Hosokawa | H02M 3/33592 363/24 |
| 2005/0030778 A1* | 2/2005 | Phadke | H02M 1/34 363/132 |
| 2009/0129123 A1 | 5/2009 | Taurand et al. | |
| 2011/0103097 A1 | 5/2011 | Wang et al. | |
| 2011/0194206 A1* | 8/2011 | Sase | H02M 3/33592 360/75 |
| 2013/0223103 A1 | 8/2013 | Pahlevaninezhad et al. | |
| 2014/0254203 A1* | 9/2014 | Dai | H02M 3/3353 363/17 |

FOREIGN PATENT DOCUMENTS

| | | |
|---|---|---|
| JP | 2005-224012 | 8/2005 |
| WO | 2007/145388 | 12/2007 |

OTHER PUBLICATIONS

J. Dudrik et al., "Voltage Fed Zero-Voltage Zero-Current Switching PWM DC-DC Converter", 13th International Power Electronics and Motion Control Conference, 2008, PP.

Austria Search Report conducted in Austria Appln. No. A50845/2013 (dated Oct. 3, 2014).

\* cited by examiner

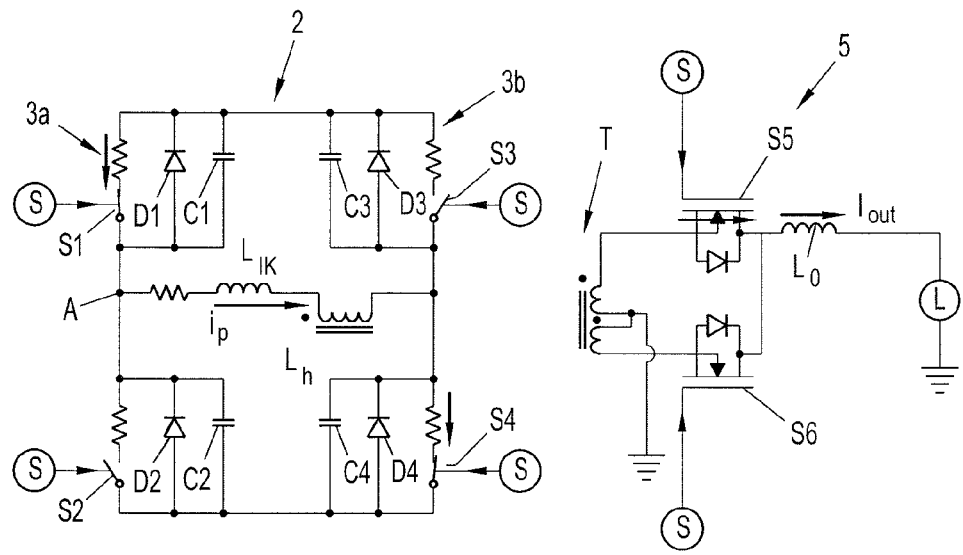
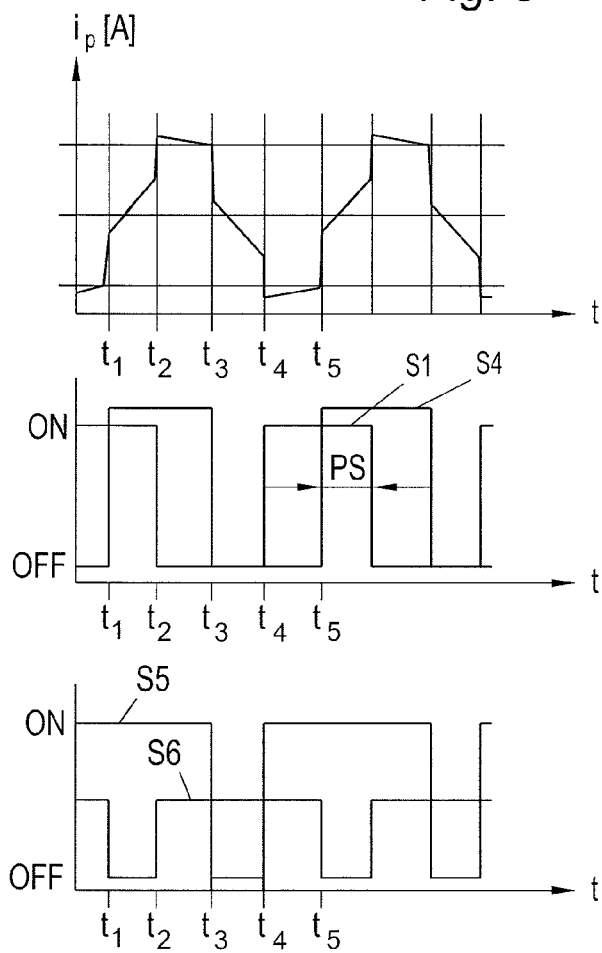
Fig. 3
Fig. 4

METHOD FOR CONTROLLING A FULL-BRIDGE DC-DC CONVERTER

The present invention relates to a method for controlling a full bridge DC/DC converter with a primary-side full bridge and a secondary-side output rectifier, which are connected to each other by a transformer, wherein the full bridge is switched through a positive active phase, a positive passive phase, a negative active phase and a negative passive phase with the two respective switches arranged in the two bridge branches and connected in series in a successive and repetitive manner, with alternating active and passive phases.

Full bridge DC/DC converters (so-called full bridge converters) consist of a full bridge with two bridge branches on the primary side, each having two semiconductor switches (usually implemented as a FET, MOSFET or IGBT). The primary side of a transformer is connected between the semiconductor switches of each bridge branch. The secondary side of the transformer is connected to a secondary-side rectifier of any design, for example as a synchronous rectifier with a center circuit and active switches or as a center rectifier with diodes. A load is connected to the secondary-side rectifier. Such full bridge DC/DC converters are well known. Examples can be found for example in J. Dudrik, et al., "Novel soft switching DC/DC converter with controlled output rectifier," 15th International Power Electronics and Motion Control Conference, EPE-PEMC 2012 ECCE Europe, Novi Sad, in U.S. Pat. No. 6,185,111 B1 or in JP 2005 110384 A2.

In a full bridge DC/DC converter with phase shift control (so-called full bridge phase shift converter), the output voltage is controlled by adjusting the phase shift of the square-wave voltages of the two bridge branches of the primary-side full bridge to one another. Preferably, the duty cycle of the two bridge branches is 50%, reduced by a constant or variable dead time.

In order to reduce the switching loss of the semiconductor switches, switching at zero voltage (so-called zero voltage switching ZVS) can be provided. The operation of ZVS is well known and therefore not further described herein. For this purpose, in each case, a capacitor and a diode are connected in parallel at the individual semiconductor switches of the full bridge. A FET semiconductor switch of a full bridge is known to have a parallel intrinsic body diode and a parasitic output capacity, which can also be used for switching at zero voltage. Such a full bridge DC/DC converter with phase shift control and ZVS is evident for example from US 2013/0223103 A1.

ZVS is also envisaged in U.S. Pat. No. 6,185,111 B1. It is provided to delay the switching to a passive switching phase until the primary-side voltage has dropped to zero. By switching to a passive switching phase, a short-circuit across the secondary side of the transformer is generated on the secondary side. Similar observations can be taken from US 2004/0136209 A1 for a DC/DC converter without transformer and with center tapping.

JP 2005-110384 A2 describes a DC/DC converter with a diode bridge on the secondary side and aims to prevent resulting voltage spikes during the switching of the primary-side switches. For this purpose, a short-circuit is generated in the positive active phase on the secondary side by additional active switches in the diode bridge and only ended in the following negative active phase.

It is known that at low loads and a resulting low primary current $i_P$, switching at zero voltage is not possible or only possible to a limited extent in conventional full bridge DC/DC converters with phase shift control and ZVS. This stems from the fact that at low loads, not enough energy (stored by primary current $i_P$ according to $E=\frac{1}{2} \cdot L \cdot i_P^2$ in inductance L) is present to fully charge and discharge the switch capacities, which is necessary for ZVS. This problem occurs for example in U.S. Pat. No. 6,185,111 B1 or US 2004/0136209 A1. In order to solve this issue, various measures are proposed in the prior art. Some are based on introducing an additional inductance as an energy storage in any manner in order to use additional energy stored therein at low load for switching at zero voltage. Examples include US 2013/0223103 A1 already mentioned above or U.S. Pat. No. 5,563,775 A. However, the additional inductance usually requires additional space, causes additional costs and is therefore disadvantageous. U.S. Pat. No. 6,185,111 B1 or US 2004/0136209 A1 do not approach ZVS at low loads.

It is therefore an object of the present invention to provide a full bridge DC/DC converter with phase shift control and ZVS which enables the semiconductor switches of the full bridge to switch at zero voltage (ZVS) even at low loads and without additional inductance.

According to the present inventions, this object is achieved in that in the transition phase from the active to the passive phase before switching to a passive phase, a short-circuit is generated in the secondary-side output rectifier, which results in an increase of the primary current across the primary side of the transformer due to the resulting short-circuit current across the secondary side of the transformer. On the primary side of the transformer, this short-circuit current forces an increase of the primary current, which in turn causes an increase of the currents through the capacities of the switches. The additional current is sufficient to fully charge and discharge the capacities of the switches and to therefore realize ZVS. The increase of the primary current does not influence the load L of the full bridge DC/DC converter.

To prevent harmful voltage spikes at the switches of the output rectifier, the short-circuit in the output rectifier is advantageously ended before switching to the next active phase.

Preferably, the short-circuit is maintained during the passive phase in order to store sufficient energy in the leakage inductance of the transformer for the following switching operation in the full bridge due to the increased primary current, so that the switching at zero voltage is ensured.

In order to prevent an excessive increase of the primary current, the short-circuit is preferably generated after completing the preceding active phase.

In the case of negative output currents, the duty cycle of the switches of the first bridge branch or the second bridge branch may be reduced for a transition to a blocking mode of the full bridge DC/DC converter. Thus, the size of the negative output currents can easily be limited to an acceptable and safe level.

Preferably, in the blocking mode, the short-circuit in the secondary-side output rectifier is generated during a passive phase to ensure that the active phase is not interrupted by the switching in the output rectifier, which would be detrimental to the blocking mode.

For a transition from the blocking mode to a normal operation of the full bridge DC/DC converter, it is advantageous to increase the duty cycle of the switches of the first bridge branch or the second bridge branch. This enables an easy switching from the blocking mode to full load of the full bridge DC/DC converter.

For partial load, the duty cycles of the switches of the first bridge branch or the second bridge branch are advantageously set earlier in time for a transition from the blocking mode to the normal operation of the full bridge DC/DC converter. This shortens the active switching phases of the full bridge DC/DC converter 1, which forces the control unit of the full bridge DC/DC converter to correct the phase shift in order to achieve the desired output voltage. This can be repeated until the desired duty cycle of 50% in the full bridge of the full bridge DC/DC converter is achieved.

The present invention will be explained in more detail hereinafter with reference to the FIG. 1 to . . . , which, by way of example, schematically and in a non-restrictive way, show advantageous embodiments of the invention.

Figure 2:
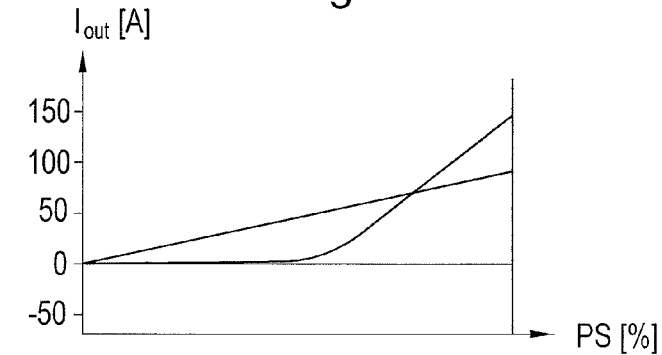
Figure 2:
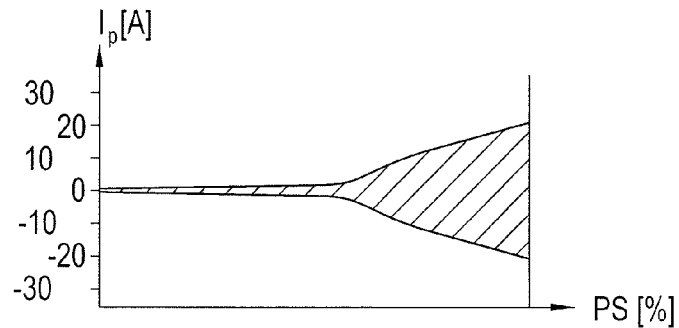
Figure 10:
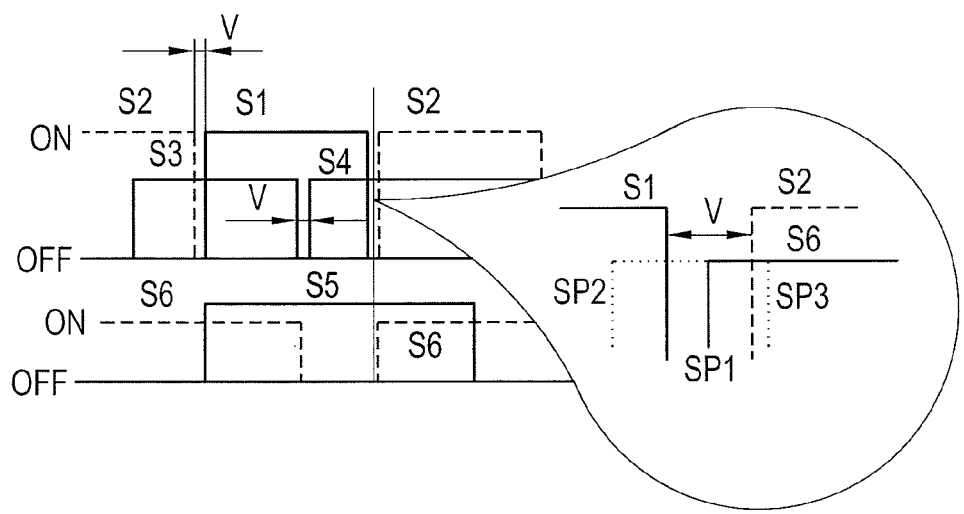
Figure 11:
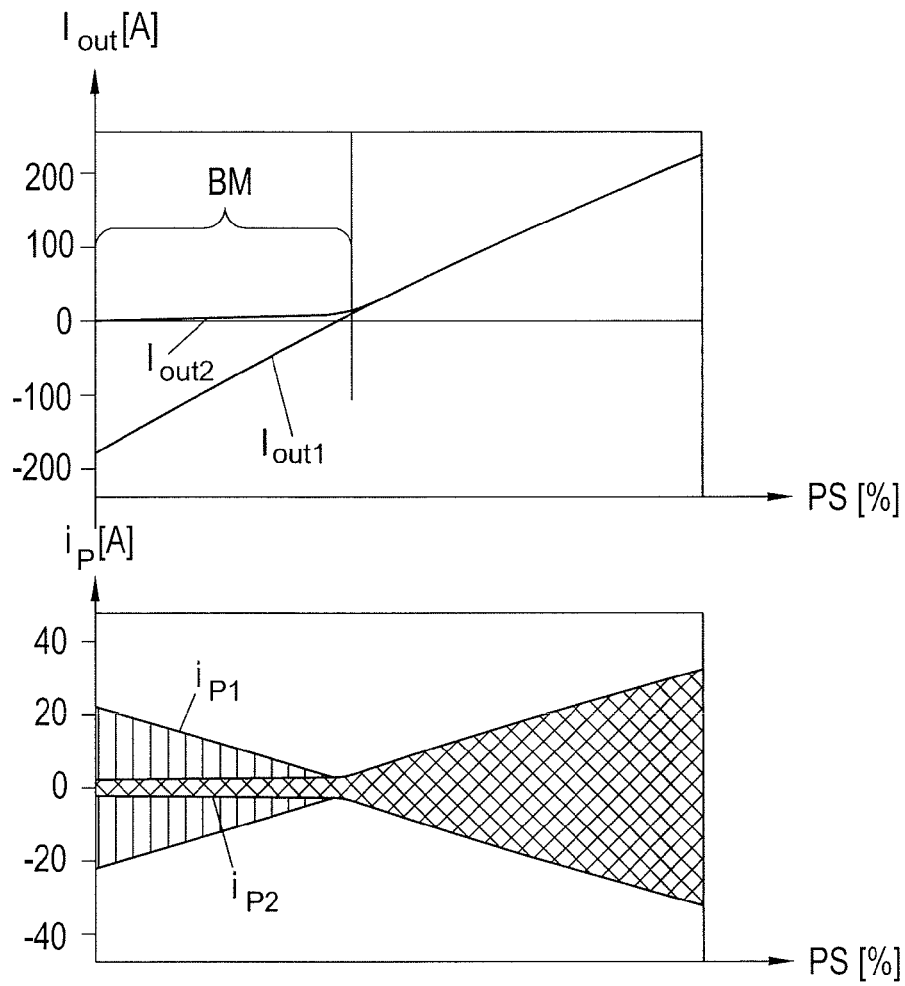
Figure 12:
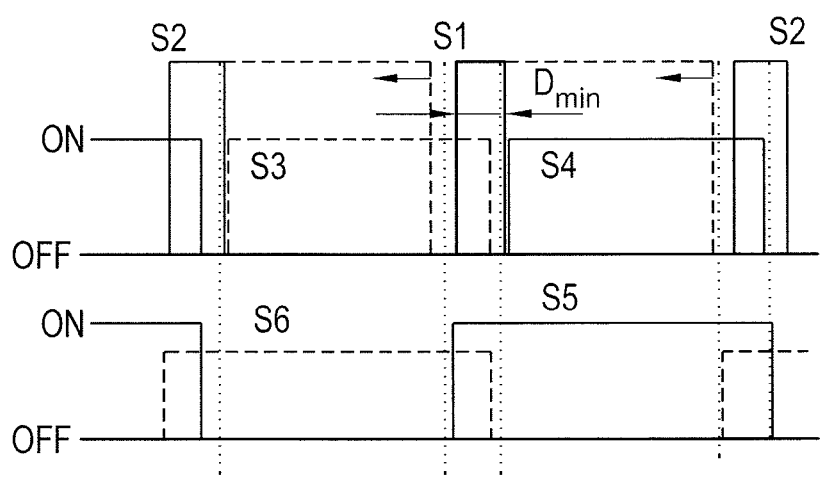
Figure 21:
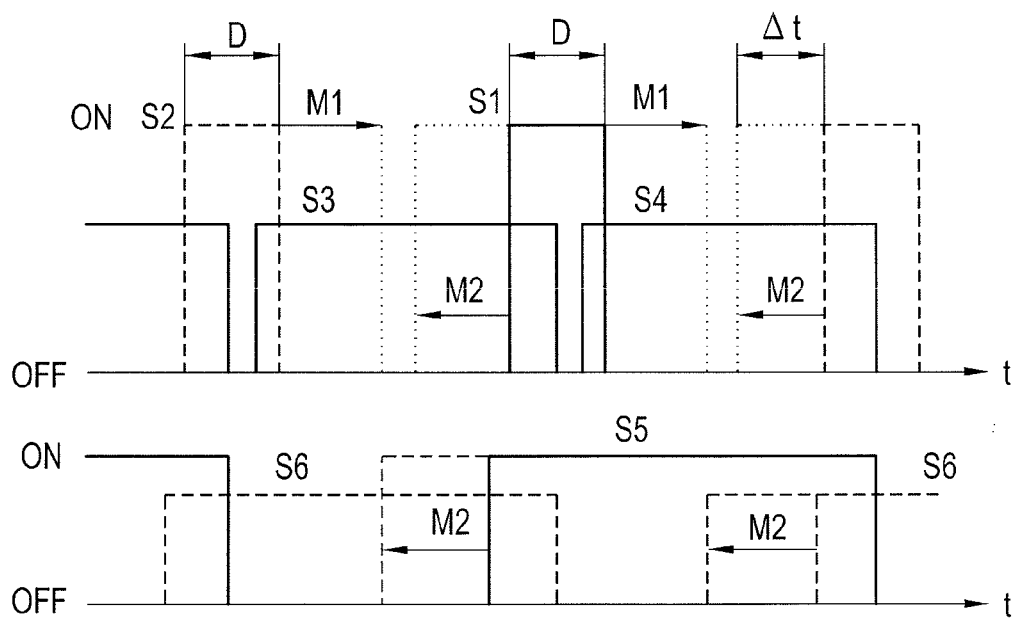

FIG. 1 shows a full bridge DC/DC converter,

FIG. 2 shows a typical characteristic of the output current and the primary current of a full bridge DC/DC converter in dependence on the phase shift, FIGS. 3 to 9 show switching phases of the full bridge DC/DC converter in normal operation when controlled according to the invention, FIG. 10 shows the switching points of the switches of the output rectifier when controlled according to the invention, FIG. 11 shows a characteristic of the output current and the primary current of a full bridge DC/DC converter desired for a certain application in dependence of the phase shift, FIG. 12 shows the reduced duty cycle of the switches of a bridge branch of the full bridge in the blocking mode, FIGS. 13 to 20 show switching phases of the full bridge DC/DC converter in the blocking mode when controlled according to the invention and FIG. 21 shows the switching of the full bridge DC/DC converter from the blocking mode to normal operation.

In FIG. 1, an full bridge DC/DC converter 1 with phase shift control and switching at zero shift (ZVS) according to the invention is shown. The primary-side full bridge 2 is connected to a DC voltage source VDC on the input side and a smoothing capacitor $C_{in}$ can also be provided at the entrance. The full bridge 2 consists of two bridge branches 3a, 3b with two switches S1, S2 connected in series in bridge branch 3a and two switches S3, S4 connected in series in bridge branch 3b. The switches S1, S2, S3, S4 can be designed as semiconductor switches, such as, for example, as FET, MOSFET, IGBT, etc. The switches S1, S2, S3, S4 are controlled by a control unit S, as indicated in FIG. 1. Arranged parallel to the switches S1, S2, S3, S4 is a respective diode D1, D2, D3, D4, and a capacitor C1, C2, C3, C4 (in the case of semiconductor switches usually formed from the intrinsic body diode and parasitic output capacity) in order to realize the switching at zero shift (ZVS) in conjunction with the leakage inductance $L_{lk}$ and the main inductance $L_h$ of the transformer T. Bridge tapping points A, B are provided between the switches S1, S2 and S3, S4 of each bridge branch 3a, 3b.

At the bridge tapping points A, B, the primary side of the transformer T is connected between the two bridge branches 3a, 3b as usual, so that the primary current $i_P$ flows through the primary winding of the transformer T switched between the bridge tapping points A, B. The secondary side of the transformer T is connected to an output rectifier 5, here in the form of a synchronous rectifier. Here, the output rectifier 5 is designed as the center circuit 4 with two rectifier branches 4a, 4b, each having a switch S5, S6, and an output inductor $L_o$. The switches S5, S6 can in turn be designed as semiconductor switches, such as, for example, as FET, MOSFET, IGBT, etc., and can again be controlled by a control unit S. Optionally, but usually desired for example as a filter, a smoothing capacitor $C_o$ can also be provided in the output rectifier 5 after the output inductor $L_0$. An electric load L, through which the output current $I_{out}$ flows, is connected to the secondary-side output rectifier 5.

In the case of phase shift control, the duty cycle of the switches S1, S2, S3, S4 of the two bridge branches 3a, 3b of the full bridge 2 is preferably kept constant at 50% (minus a dead time). The output voltage $U_{out}$, which in dependence on the load L, for example a battery, a welding arc, an electronic device etc., leads to an output current $I_{out}$ and to a primary current $i_P$, is set by the phase shift PS of the square-wave voltages in the bridge branches 3a, 3b.

Such a full bridge DC/DC converter 1 with phase shift control and ZVS can for example be used in a switching power supply, as a power source for a welding machine or in a battery charger. FIG. 2 shows an example of the typical characteristic of the output current $I_{out}$ (at the top) and the primary current $I_P$ (at the bottom) respectively depending on the phase shift PS when using the full bridge DC/DC converter 1 with phase shift control and ZVS as a battery charger, i.e. having a capacitive load L. The significant kink in the output current characteristic results from the transition from a discontinuous current flow in the output choke $L_o$ (discontinuous conduction mode, DCM) to the continuous current flow in the output choke $L_o$ (continuous conduction mode, CCM). DCM occurs for example because a charger has to maintain the battery voltage even after the main charging sequence. Therefore, the charger and thus the full bridge DC/DC converter 1 must be able to also deliver small output currents $I_{out}$ (DCM). But such low currents are not sufficient to realize zero voltage switching in the switches S1, S2, S3, S4 of the full bridge 2. The same problems can of course also occur with other applications of a full bridge DC/DC converter 1 with phase shift control and ZVS.

In the following, the individual switching phases of a full bridge DC/DC converter 1 with phase shift control and ZVS will be described with reference to the FIGS. 3 to 9 and the present invention will be explained as well. Basically, it is known that in the active switching phase, power from the primary side of the full bridge DC/DC converter 1 is transferred to the secondary side of the full bridge DC/DC converter 1 and in the passive switching phase (also referred to as freewheeling phase), no power is transferred. In FIGS. 3, 5 to 9, and also 13, 14 to 20, the transformer T is shown split for reasons of simplicity, that is, the primary side of the full bridge DC/DC converter 1 is separated from the secondary side of the full bridge DC/DC converter 1.

FIG. 3 shows the positive active switching phase of the full bridge DC/DC converter 1 between the time $t_1$ and $t_2$, and FIG. 4 shows the associated switch positions of the switches S1, S2, S3, S4, S5, S6 as well as the time course of the primary current $i_P$. Here, the switches S1 and S4 of the full bridge 2 are closed and switch S5 of the output rectifier 5 is closed and switch S6 of the output rectifier 5 is opened. For better visualization, the switches S5, S6 are presented with different amplitudes in FIG. 4. This leads to a current flow of the primary current $i_P$ through the primary side of the transformer T and an output current $I_{out}$.

Figure 5:
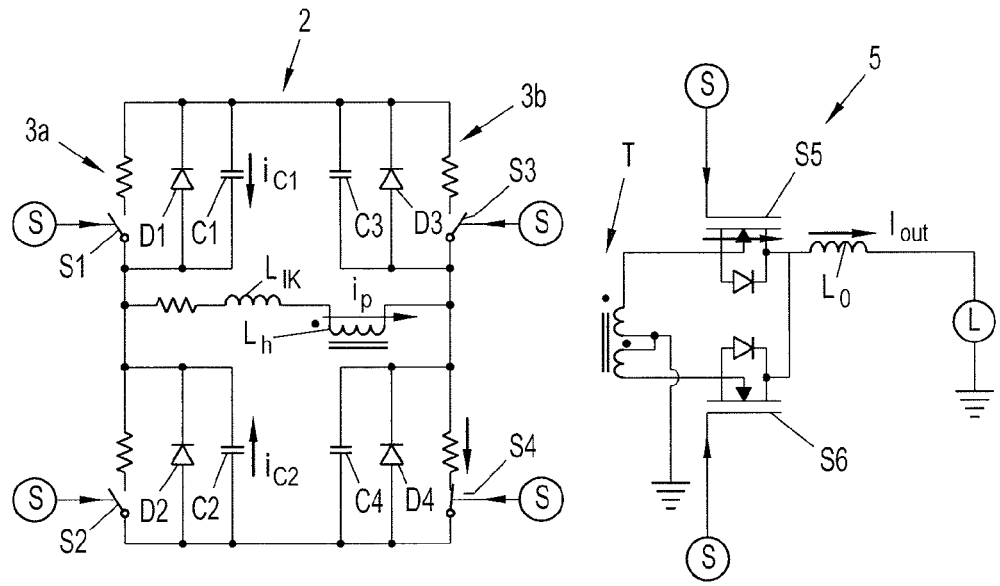
Figure 6:
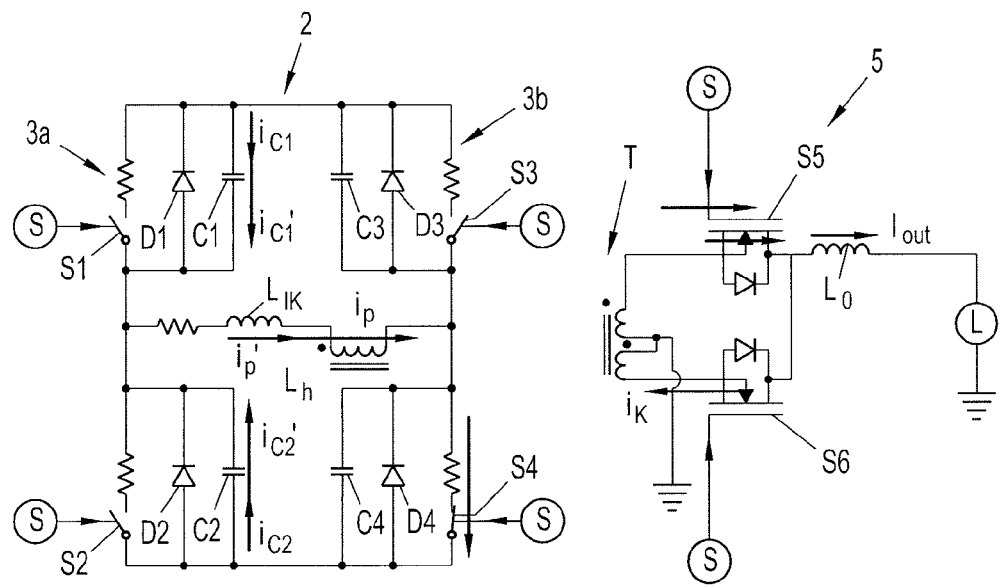

The transition from the active to the passive positive switching phase at the time $t_2$ is shown in FIGS. 5 and 6 in conjunction with FIG. 4. This transition phase is initiated at the time $t_2$ by opening the switch S1 of the first bridge branch 3a. At a low load L, the primary current $i_P$ would be too low to fully charge the capacitor C1 at the switch S1 by means of the resulting current $i_{C1}$ and to fully discharge the capacitor C2 at the switch S2 by means of the resulting current $i_{C2}$. This means that ZVS could not be realized at a low load L. To prevent this, a short-circuit in the secondary-side output rectifier 5, which causes an additional short-circuit current $i_K$ on the secondary side of the transformer T, is created in this transitional phase at the time $t_2$ on the secondary side of the full bridge DC/DC converter 1. The short-circuit current $i_K$ circulates in the output rectifier 5 through the rectifier branches 4a, 4b and the secondary side of the transformer T. In the illustrated exemplary embodiment, this is achieved by also closing the switch S6 of the output rectifier 5 (FIG. 6). Here, the additional short-circuit current $i_K$ circulates through the secondary side of the transformer T, the switch S5 and the switch S6. When the capacitors C1, C2 are not completely charged or discharged, the short-circuit is present when power is still present on the primary side of the transformer T. This short-circuit current $i_K$ therefore forces an increase of the primary current $i_P$ by the current $i_P'$ on the primary side of the transformer T, which in turn causes an increase of the currents through the capacitors C1 and C2 by $i_{C1}'$ and $i_{C2}'$. The additional current $i_P'$ is limited by the leakage inductance $L_{lk}$. The resultant currents ($i_{C1}+i_{C1}'$) and ($i_{C1}+i_{C1}'$) across the capacitors C1, C2 are sufficient to fully charge and discharge them and to therefore realize ZVS. The increase of the primary current $i_P$ to $i_P'$ does not affect the load L, since the additional short-circuit current $i_K$ circulates on the secondary side in the output rectifier 5.

Figure 7:
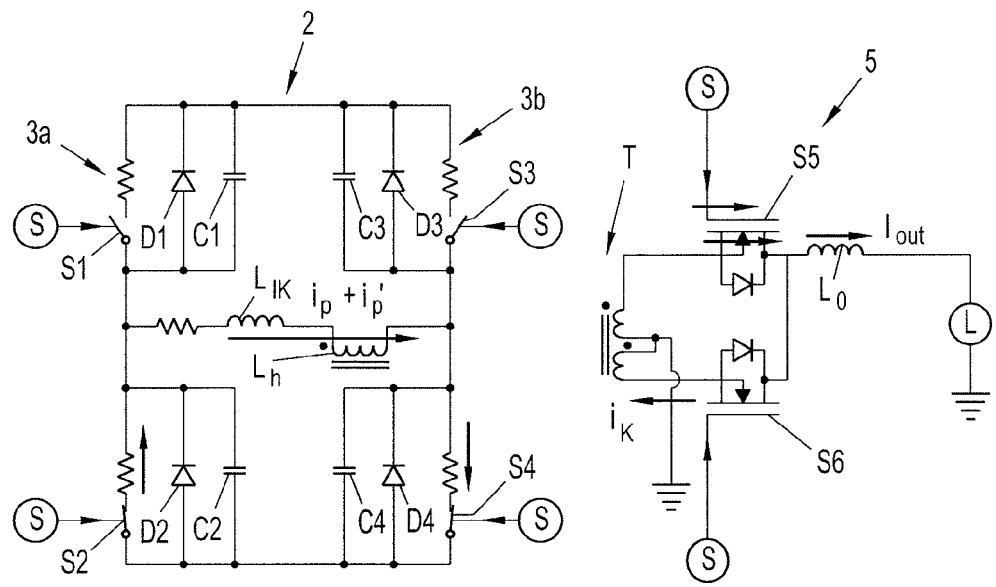

In the following positive passive phase during the period $t_2$ to $t_3$, the switch S2 of the first bridge branch 3a is closed and the capacitor C1 is fully charged (FIG. 7, FIG. 4). However, the short-circuit on the secondary side through both closed switches S5, S6 of the output rectifier 5 preferably is maintained, causing the short-circuit current $i_K$ to continue to flow. Due to the continued flow of the additional primary current $i_P'$, extra energy is stored in the leakage inductance $L_{lk}$ of the transformer T. In this phase, the transformer T of the full bridge 2 is in the short-circuit phase due to the through-connected switch S2 and the conducting diode D2, as shown in FIG. 7.

Figure 8:
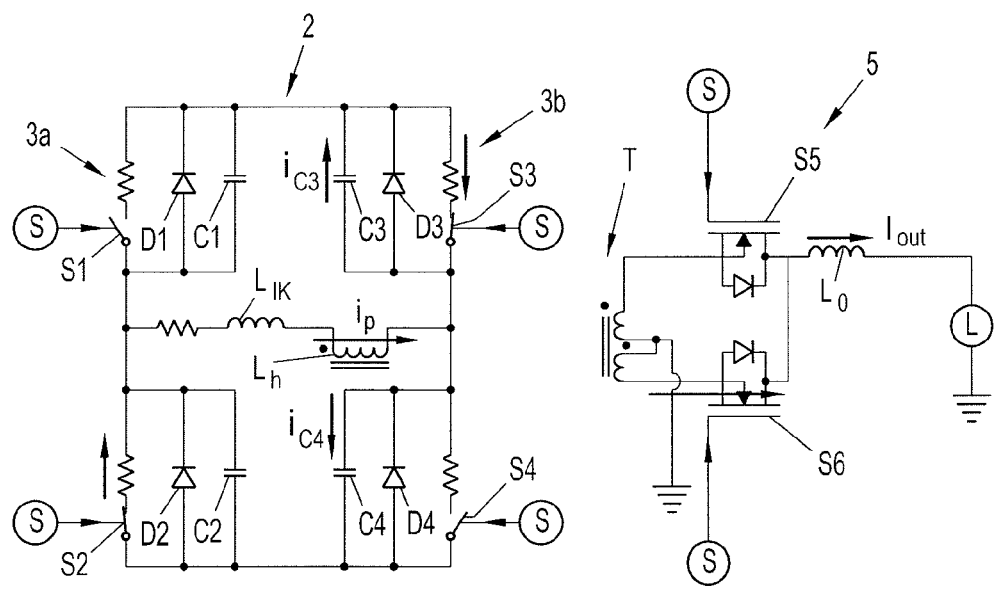
Figure 9:
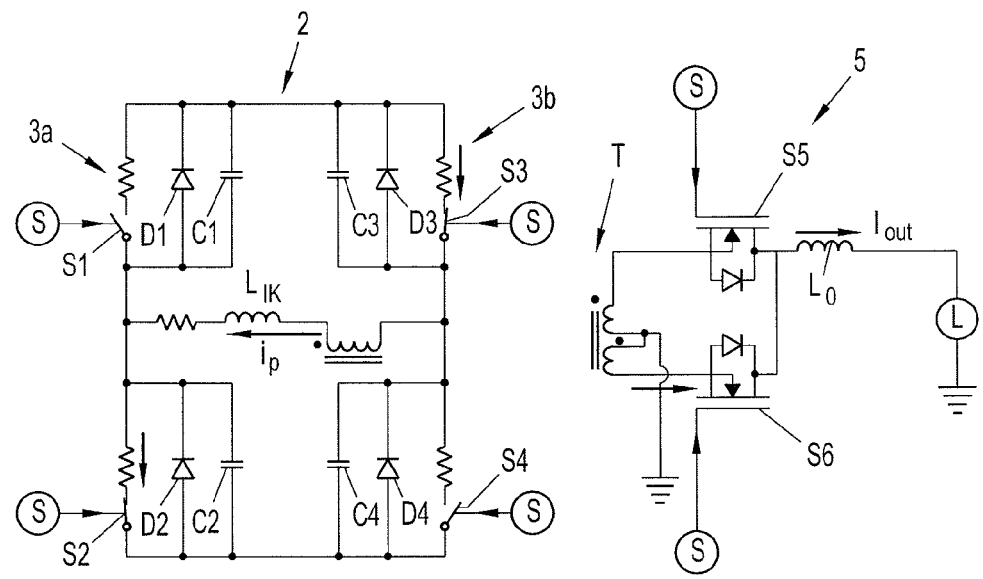

During the transition from the positive passive phase to the negative active phase at the time $t_3$, the switch S4 is opened and the switch S3 is closed in the second bridge branch S4, as is described with reference to FIG. 8. Simultaneously, the switch S5 in the output rectifier 5 on the secondary side of the full bridge DC/DC converter 1 is opened and the switch S6 remains closed. Thus, the short-circuit in the secondary-side output rectifier 5 is terminated. The additional energy stored in the previous phase due to the increased primary current $i_P'$ in the leakage inductance $L_{lk}$ on the primary side of the full bridge DC/DC converter 1 is used to fully discharge the capacitor C3 in a safe manner and to fully charge the capacitor C4 in a safe manner in order to realize ZVS when switching, even at low loads L.

In the negative active phase following the switching of the switches S4, S3 during the period between $t_3$ and $t_4$ (FIG. 9), the switches S3, S2 in the full bridge 2 are closed and the switch S6 of the output rectifier 5 is closed.

In the now following reversed transition from the negative active phase to the negative passive phase and further to the positive active phase (as in FIG. 3), a short-circuit in the secondary-side rectifier 5 is effected during the time $t_4$ to $t_5$ in an analogous manner as described above in order to realize ZVS during the switching of the switches S1, S2, S3 and S4 even at low loads L. Thus, the switching cycle can be repeated.

In order to be able to realize the invention, the output rectifier 5 must be actively controlled in dependence on the switching state of the full bridge 2 in order to produce the short-circuit at the required times. Basically, when transitioning from an active switching phase, characterized by diametrically (in relation to the bridge tapping points A, B) closed switches S1 and S4 or S2 and S3 in the bridge branches 3a, 3b, to a passive switching phase, characterized by adjacently (in relation to the bridge tapping points A, B) closed switches S1 and S3 or S2 and S4, a short-circuit must be generated. For the reverse transition from a passive switching phase to an active switching phase, the short-circuit must be ended. During a passive switching phase, the short-circuit preferably is continued.

In the illustrated exemplary embodiment, the switches S5, S6 of the secondary-side output rectifier 5, here in the form of a synchronous rectifier, are actively controlled, e.g. by a control unit S. In doing so, the activation points of the switches S5, S6 are synchronized with the switching points of the switches S1, S2, S3, S4 of the full bridge 2 as described below in order to be able to implement ZVS.

It is known that the switches S1, S2 and S3, S4 of the two bridge branches 3a, 3b do not switch at exactly the same time, but with a switching delay V, typically in the ns range, e.g. 100 ns to 300 ns, as shown in FIG. 10. The switch-on point of the switch S5, S6 of the output rectifier 5, which causes the short-circuit on the secondary side, must be synchronized with the switch-off point of the respective switch S1, S2, S3, S4 of the full bridge 2, as described in FIG. 10 with reference to the switches S1, S2 and S6. The optimal switch-on point SP1 for the switch S6 of the secondary-side output rectifier 5 is in the range of the switching delay V between the switches S1, S2 of the first bridge branch 3a (corresponding to FIG. 6, FIG. 4). The optimal switch-on point SP1 is therefore in the transition phase from the active to the passive phase, i.e. after the active phase was completed by opening the switch S1 and before the passive phase starts by closing switch S2. A switch-on point SP2 before switching off switch S1, i.e. before the active phase is completed, would lead to a higher additional primary current $i_P'$. A switch-on point SP3 after switch S2 had been activated, i.e. after the passive phase has started, would prevent ZVS at low loads and is therefore to be avoided. The same also applies analogously for the switch-on points of switch S5.

The switch-off points of the switches S5, S6 of the secondary-side output rectifier 5 are preferably set at or near a current zero crossing of the current through the switches S5, S6. Switching off too early would increase the period in which the body diode of the switches S5, S6 conducts, which would be manifested in a loss of efficiency due to higher conductive end losses, and would further lead to an increase of the reverse recovery time of the body diode of the switches S5, S6, which would result in higher losses and higher voltage spikes at the switches S5, S6. Switching off too late would result in a secondary-side short-circuit while the primary side is in the positive or negative active phase. This would lead to high primary currents $i_P$ and high $di_P/dt$, which in turn would lead to undesired voltage peaks at the switches S5, S6 of the secondary-side rectifier, which can also destroy the switches S5, S6.

In case of a load L, which can also serve as a voltage source, such as a battery, a negative output current $I_{out}$ can arise as well, as shown in FIG. 11 with output current $I_{out1}$ and primary current $I_{P1}$. This means that current flows from the output of the full bridge DC/DC converter 1 to the voltage source VDC or to the smoothing capacitor $C_{in}$. This can also lead to an over-voltage across the smoothing capacitor $C_{in}$, which is undesirable. Apart from that, it is immediately apparent that such a mode of operation would be counterproductive in particular when using the full bridge DC/DC converter 1 in a battery charger due to the discharging of the battery and should therefore be avoided.

Therefore, there are applications of a full bridge DC/DC converter 1 where a negative output current $I_{out}$, the so-called regenerative operation mode, should generally be avoided or at least reduced. What is desired here is a starting current characteristic as shown in FIG. 11 with $I_{out1}$ and $I_{P2}$. It is characterized by a blocking mode BM of the full bridge DC/DC converter 1, which ensures that the negative output current $I_{out}$ is reduced to an acceptable and safe size.

In order to achieve the desired output current characteristic as shown in FIG. 11, the duty cycle of the switches S1, S2 in the first bridge branch 3a of the full bridge 2 is drastically reduced in the blocking mode BM of the full bridge DC/DC converter 1, preferably to a value between zero and the minimum possible duty cycle $D_{min}$, which is essentially predetermined by the specification of the switch S1, S2 in the form of the switching time. Normal duty cycles D of used switches S1, S2 are in the range of >70 ns. The switches S3, S4 of the second bridge branch 3b continue to work as described above. This is exemplified in FIG. 12. The switch-on and switch-off points of the switches S5, S6 of the rectifier 5 are also set as described above, i.e. synchronized to the switches S1, S2. Instead of the duty cycle D of the switches S1, S2 of the first bridge branch 3a, the duty cycle of the switches S3, S4 of the second bridge branch 3b could of course also be reduced. In this case, the switches S1, S2 of the first bridge branch 3a would be switched with phase shift control as in a standard full bridge 2.

The effect of this measure will now be described hereinafter with reference to the FIGS. 13 to 20 on the assumption of a negative output current $I_{out}$.

Figure 13:
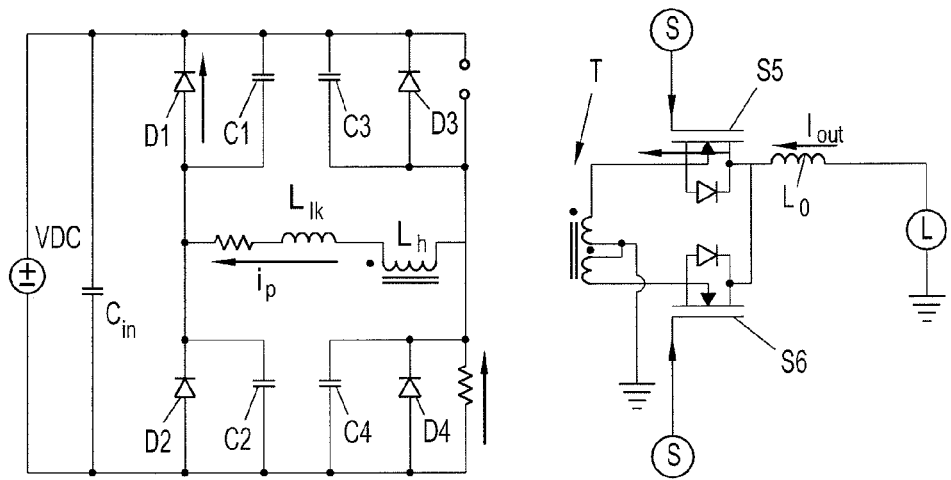
Figure 14:
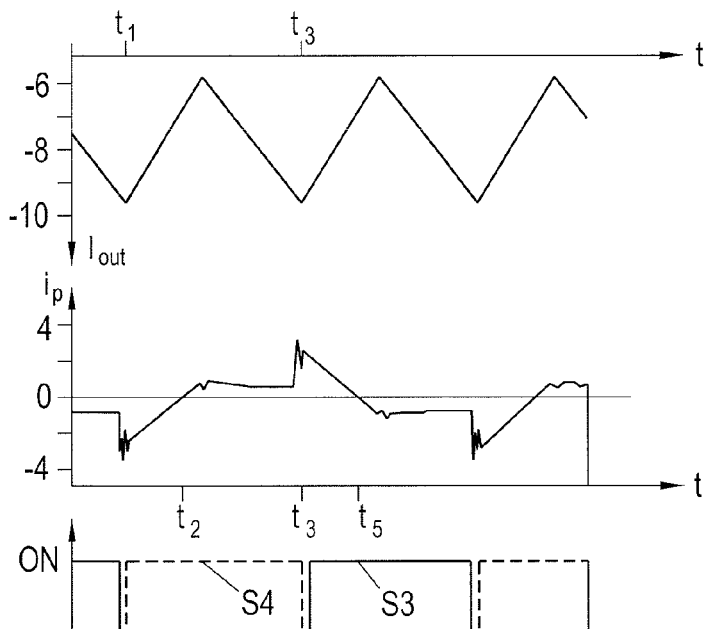
Figure 14:
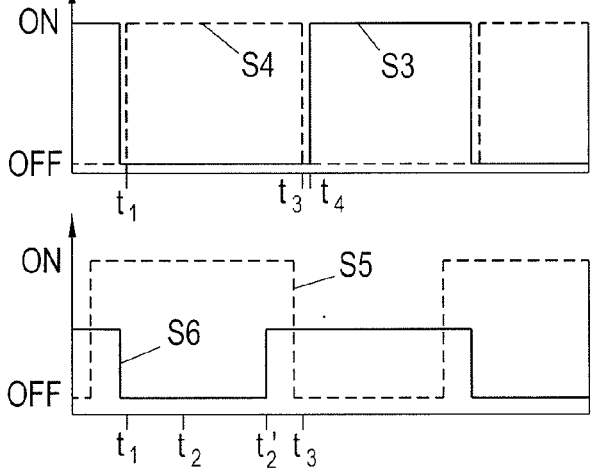
Figure 15:
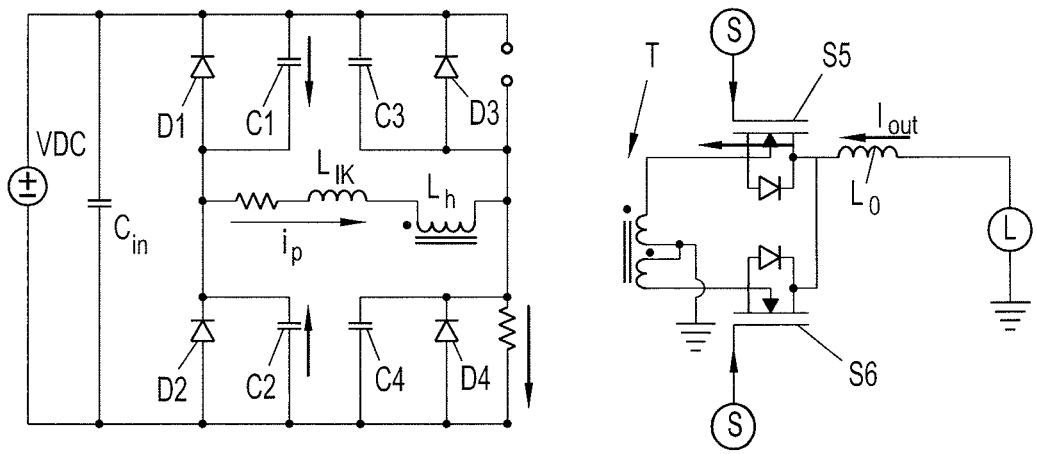
Figure 16:
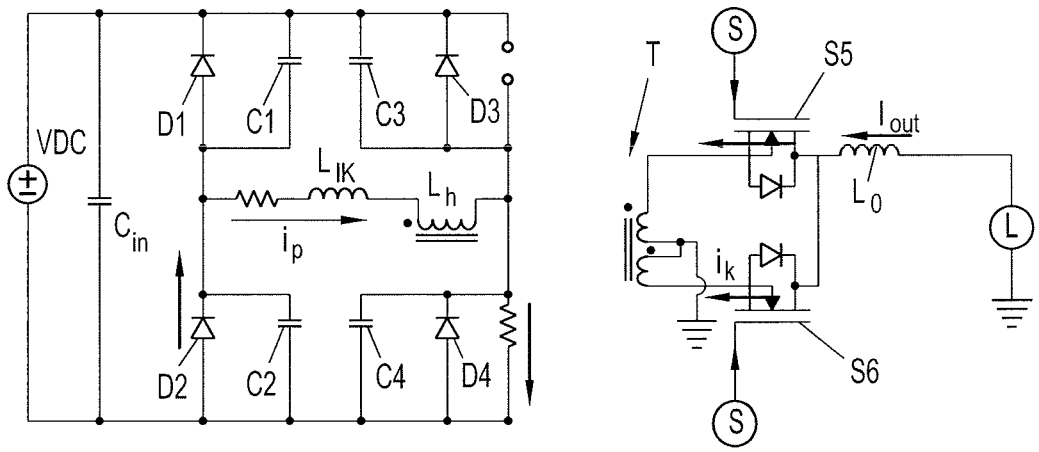
Figure 17:
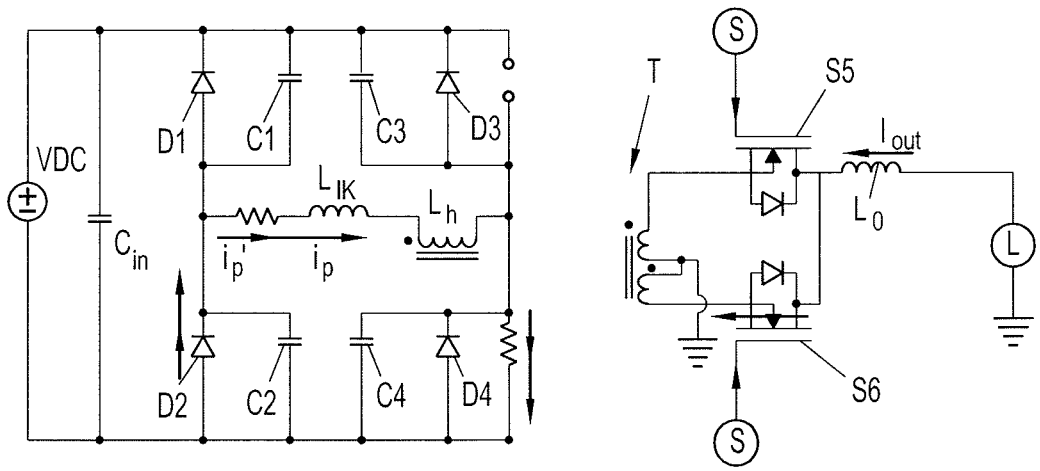

FIG. 13 shows the positive active switching phase in the blocking mode BM during the period between $t_1$ and $t_2$. FIG. 14 again shows the temporal course of the output current $I_{out}$, the primary current $i_P$ and the switching positions of the switches S3, S4, S5, S6. In this description, the switches S1, S2 are assumed as continuously open (duty cycle D=0) for reasons of simplicity. The switch S4 of the second bridge branch 3b and the switch S5 of the output rectifier 5 are closed while switch S3 is open. The primary current $I_P$ driven by the negative output current $I_{out}$ flows across the conducting diode D1 to the DC voltage source VDC. However, the voltage applied at the smoothing capacitor $C_{in}$ also applies to the primary side of the transformer T, which forces a positive slope of the output current $I_{out}$, whereby the latter decreases. Likewise, the negative primary current $i_P$ decreases during this period $t_1$-$t_2$, which ultimately leads to the fact that the primary current $i_P$ changes its sign, as indicated in FIG. 15. Since the switch S1 is open, the capacitor C1 is charged by the primary current $i_P$ and the capacitor C2 is discharged. By discharging the capacitor C2, the diode D2 of the switch S2 becomes conductive, which initiates the transition from the active positive to the positive passive switching phase of the blocking mode BM at the time $t_2$, which is illustrated in FIG. 16 in the period from $t_2$ to $t_3$. Once the primary current $i_P$ has changed direction, the switch S6 of the output rectifier 5 can be closed while the switch S5 is closed (FIG. 16), whereby a portion of the output current $I_{out}$ and the short-circuit current $i_K$ is conducted across the switch S6. Thus, a short-circuit in the secondary-side output rectifier 5 is generated as well at the time $t_2'$. Through the following opening of the switch S5 of the output rectifier 5 at the time $t_3$, the flowing negative output current $I_{out}$ is now entirely guided over the switch S6, resulting in an increase of the primary current ($i_P+i_P'$) (FIG. 17).

Figure 18:
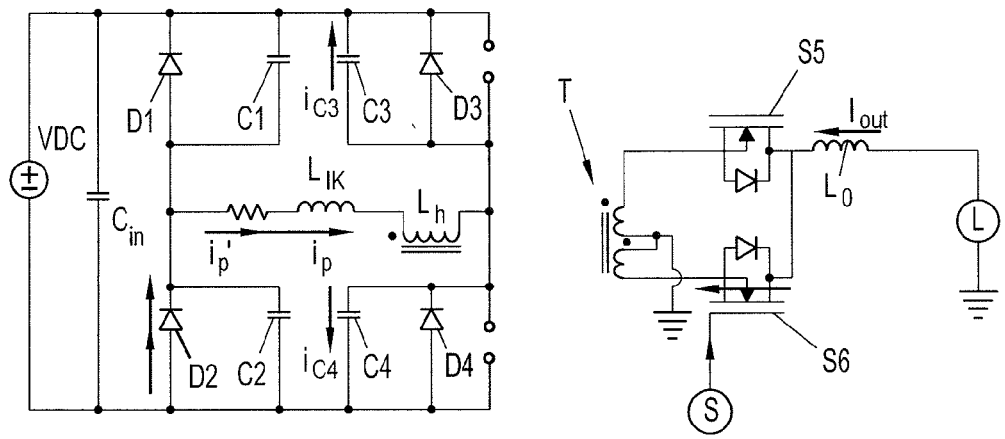
Figure 19:
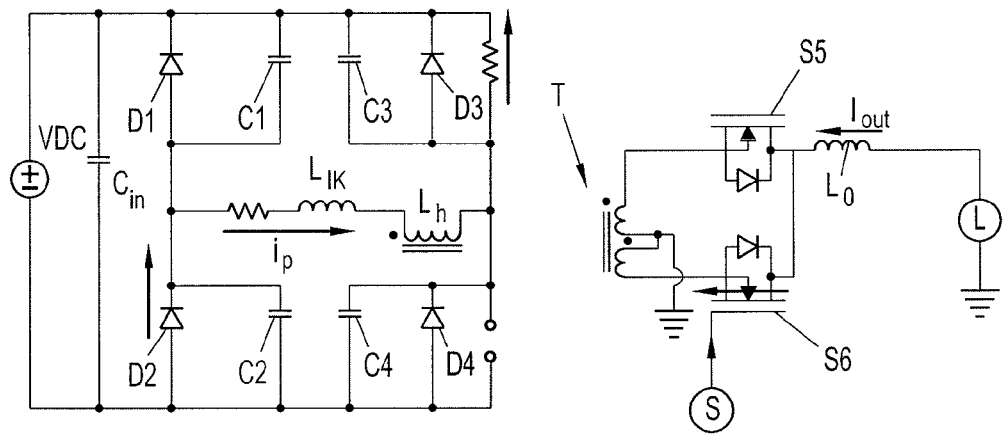
Figure 20:
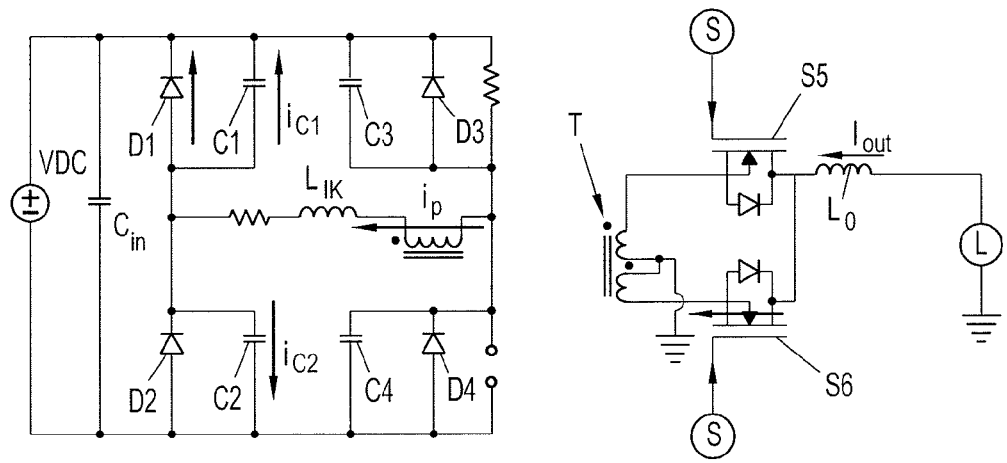

After the switch S5 of the rectifier 5 has been opened, the transition from the positive passive switching phase to the negative active switching phase is initiated at the time $t_3$ by opening switch S4, as shown in FIG. 18. The capacitor C4 of the switch S4 is charged and the capacitor C3 of the switch S3 is discharged. At the time $t_4$, the switch S3 is closed without tension, whereby in turn switching at zero crossing (ZVS) is realized.

This is followed by the negative active switching phase (FIG. 19) between time $t_4$ and $t_5$, until the sign of the primary current $i_P$ changes again at time $t_5$, thereby introducing the transition from the negative active switching phase to the negative passive switching phase (FIG. 20), which is then again followed by the transition to the positive active switching phase, thus completing an entire switching cycle.

The switches S1, S2 are switched in the blocking mode BM with a very short duty cycle D, as explained with reference to FIG. 12, and the switch-on time of the switches S5, S6 is synchronized with the switches S1, S2, as described above. The switch-on time of the switch S6 is again selected between the switches S1, S2 in the area of the switching delay V. For the blocking mode BM, it is advantageous if the switch-on time of the switch S6 is chosen during the positive passive switching phase in the period from $t_2$ to $t_3$, but not during the positive active switching phase when voltage is present on the primary side of the transformer T. This applies analogously to the negative passive phase and also to the control of the switch S5 for the blocking mode BM.

In order to ensure a safe transition from the normal mode to the blocking mode BM and vice versa, a controlled transition is advantageous. For the transition from the normal mode to the blocking mode BM, the duty cycle of the switches S1, S2 is reduced as described above. The transition from the blocking mode BM to the normal mode of the full bridge DC/DC converter 1 is explained hereinafter by way of example with reference to FIG. 21.

If a direct switching to full load of the full bridge DC/DC converter 1 from the blocking mode BM is desired, this can easily be achieved by again increasing the duty cycle D of the switches S1, S2 until the desired duty cycle of 50% (minus required dead times) is achieved. This is illustrated in FIG. 21 with the mode M1.

If a lower load L is desired when switching to the normal mode, then, in mode M1, this would already be achieved before the targeted duty cycle of 50% is achieved. Therefore, the mode M2 will in this case be chosen as illustrated in FIG. 21. Here, the switch-on times of the switches S1, S2 are set earlier in time, for example, by a time period $\Delta t$, which at the same time sets the switch-on times of the switches S5, S6 in the output rectifier 5 (which are synchronized to the switches S1, S2) earlier. This would shorten the active switching phases of the full bridge DC/DC converter 1, which would lead to a reduction in the output voltage. This forces the control unit S of the full bridge DC/DC converter 1 to correct the phase shift PS in order to achieve or maintain the desired output voltage. This can now be repeated until the desired duty cycle of 50% is achieved. The control unit S sets the necessary phase shift PS.

The invention claimed is:

1. A method for controlling a full bridge DC/DC converter with a primary-side full bridge and a secondary-side output rectifier, which are connected to each other by a transformer, wherein the full bridge includes two bridge branches, each of which has two switches arranged in series, the method comprising:

successively and repetitively switching the primary-side full bridge through a positive active phase, a positive passive phase, a negative active phase and a negative passive phase via the switches arranged in the two bridge branches to alternatingly switch between the positive and negative active and passive phases;

generating, in a transition phase from the positive or negative active to the positive or negative passive phase prior to switching to the positive or negative passive phase, a short-circuit in the secondary-side output rectifier;

increasing a primary current across a primary side of the transformer via a resulting short-circuit current across the secondary side of the transformer; and reducing a duty cycle of the two switches of the first bridge branch or of the second bridge branch in order to limit a negative output current of the full bridge DC/DC converter, and thereby create a transition to a blocking mode of the full bridge DC/DC converter.

2. The method according to claim 1, wherein the short-circuit in the secondary-side output rectifier prior to switching to a subsequent positive or negative active phase.

3. The method according to claim 2, wherein the short-circuit is maintained during the positive or negative passive phase.

4. The method according to claim 1, wherein the short-circuit is generated after completion of a preceding positive or negative active phase.

5. The method according to claim 1, wherein, in the blocking mode, the short-circuit in the secondary-side output rectifier is generated during the positive or negative passive phase.

6. The method according to claim 1, wherein, for a transition from the blocking mode to a normal operation of the full bridge DC/DC converter, the method further comprises increasing the duty cycle of the two switches of the first bridge branch or of the second bridge branch.

7. The method according to claim 1, wherein, for a transition from the blocking mode to a normal operation of the full bridge DC/DC converter, the method further comprises setting the duty cycles of the two switches of the first bridge branch or of the second bridge branch to an earlier point in time.

* * * * *